United States Patent Office 2,740,644
Patented Apr. 3, 1956

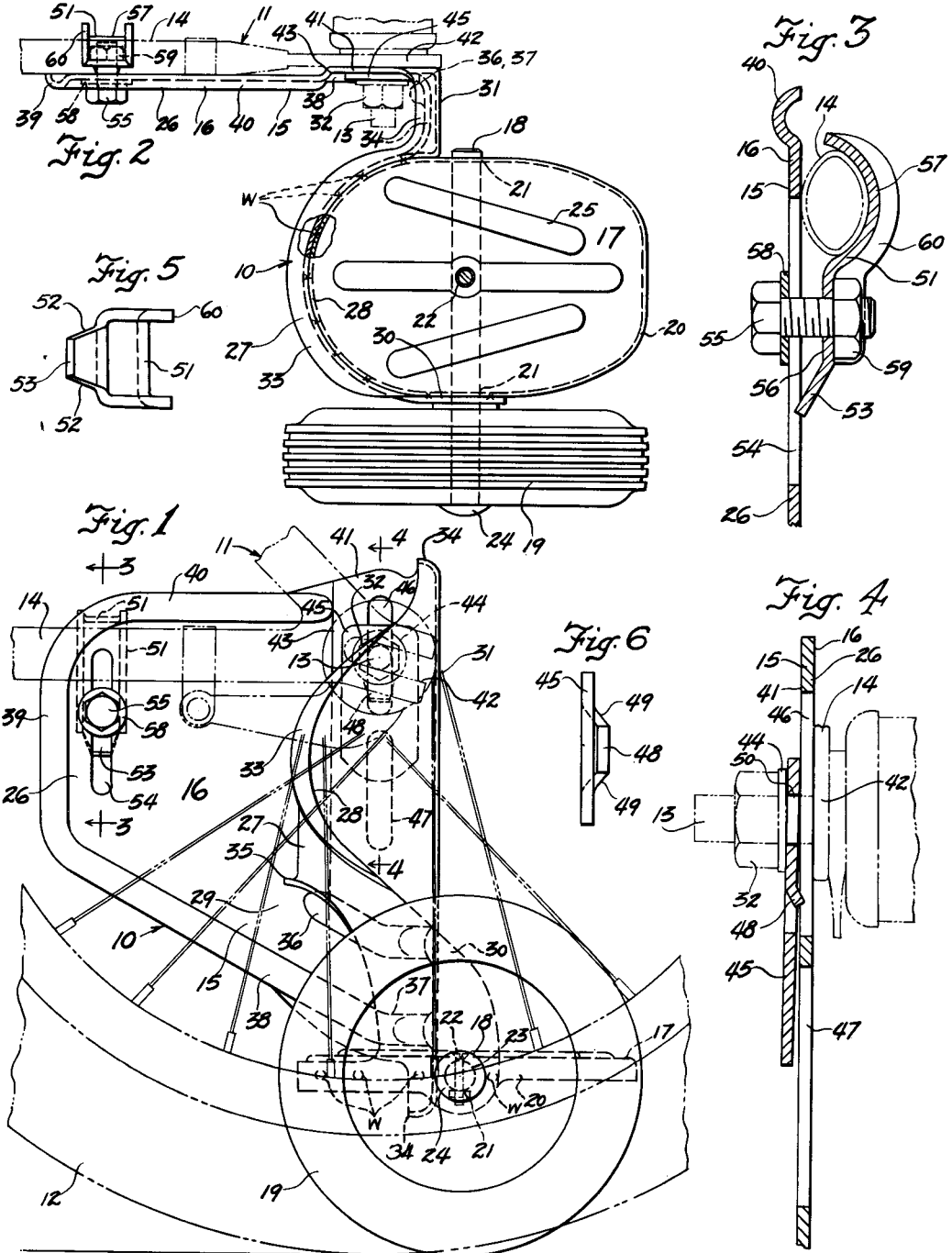

2,740,644

BICYCLE STABILIZER ATTACHMENT

Harold H. Ring and H. Jerome Strommer, Rockford, Ill., assignors to Atwood Vacuum Machine Company, Rockford, Ill., a corporation of Illinois Application November 28, 1952, Serial No. 322,889

10 Claims. (Cl. 280—304)

This invention relates to bicycle stabilizer attachments.

Bicycle stabilizer attachments like that shown, for example, in Atwood et al. Patent 2,530,498, have been widely used in the past three years. They enable a small child to ride a "two-wheeler" with safety long before that would otherwise be possible, and the parents, therefore, save the cost of a tricycle that would most likely be purchased otherwise. These attachments, which cost only a small fraction of the price of a tricycle, are removed after the child learns to ride the two-wheeler well enough to get along safely without them, and they are then either discarded or kept for future use by another child.

The principal object of our invention is to provide improved stabilizer attachments of the kind mentioned having an improved clamp construction at the front and rear ends of the attaching plate portion of each stabilizer bracket, whereby adjustments of the attaching plate relative to its connections with the rear axle and rear fork may be made easily and without likelihood of slippage spoiling the adjustment, the clamp at each location consisting of a hardened clamping plate having a tapered or keystone shaped lug projecting therefrom at an acute angle to the plane of the clamping plate and arranged with its narrowest free end projecting into a slightly wider slot provided in the attaching plate so that the sharp edges of the hardened tapered lug bite into the unhardened attaching plate at the edges of the slot and take a good hold wherever the attaching plate may be set, thereby preventing slippage. There is one vertically elongated slot in the front portion of the attaching plate with which the clamping plate that bears at one end on the rear fork and has the lug on its other end cooperates, said clamping plate being used in one position with the clamping bolt below the fork for one range of adjustments and in an end for end reversed position with the clamping bolt above the fork for another range of adjustments, the attaching plate having two vertically elongated slots in aligned relation in its rear portion with which the rear axle and the clamping plate mounted on the rear axle cooperate in the two ranges of adjustments.

The invention is illustrated in the accompanying drawing, in which—

Fig. 1 is a side view of the left hand one of a pair of stabilizer attachments embodying the improvements of our invention, the same being shown adjustably secured to the rear axle and rear fork of a bicycle in the novel manner of our invention;

Fig. 2 is a plan view of Fig. 1;

Figs. 3 and 4 are sectional details on the lines 3—3 and 4—4 of Fig. 1, and

Figs. 5 and 6 are end views of the clamping plates of Figs. 3 and 4 looking at the narrow ends of the projecting tapered lugs that bite at their edges into the attaching plate at the edges of the slots therein.

The same reference numerals are applied to corresponding parts in these six views.

Referring to the drawing, the reference numeral 10 designates a stabilizer attachment like that disclosed in Ring Design Patent No. 169,391, issued April 21, 1953, the same being shown applied to the rear portion of a bicycle that is designated generally by the reference numeral 11. The attachment shown is the left hand one of a pair disposed on opposite sides of the rear wheel 12 and attached to the opposite ends of the rear axle 13 and to opposite sides of the rear fork 14. The right hand one of the pair (not shown) is the counterpart of the one shown, and, hence, the description and illustration of one suffices for both. Each of said attachments 10 comprises a two-piece sheet metal body 15 of which one part is the generally L-shaped bracket 16 and the other part is the platform 17. The child standing behind the bicycle rider astride the rear wheel guard rests one foot on each of the two platforms. Each platform 17 carries a stub axle 18 which projects from the outer side of the platform and has a small wheel 19 mounted thereon to provide lateral support for the bicycle and thereby prevent its falling over. The platform 17 is made of sheet metal and dished so as to provide a downwardly projecting marginal reinforcing flange 20 for strength and rigidity, and registering holes 21 are provided in this flange on diametrically opposite sides of the platform to receive the axle for rigid support thereof. A single bolt 22 entered in a center hole in the platform and passed through a registering hole 23 in the axle is all that is necessary to fasten the axle to the platform, and the axle has a head 24 on its outer end to hold the wheel 19 against displacement from the axle. Upwardly embossed ribs 25 provided on the platform lend further strength and rigidity to the platform besides giving better traction so as to reduce likelihood of the youngster's foot slipping. The one leg 26 of the L-shaped sheet metal bracket 15 is substantially flat and defines the attaching plate that is fastened to the rear axle 13 and rear fork 14 of the bicycle. The other leg 27 of the L-shaped bracket 15 is integral with the rear end of the attaching plate 26 and defines a brace for rigid support of platform 17, the major portion of which is arched forwardly in a semicircle or U as indicated at 28 to define a leg well giving added leg room over the platform and having an opening 29 provided in its lower portion providing a toe-hole at the front of the platform 17 for added foot room so that the brace is in appearance and effect, a stirrup. The lower end portion of the arched portion 28 encircles the front half of the platform 17 and is spot-welded thereto at spaced intervals as indicated at W in Fig. 1 for a sturdy and yet fairly inexpensive construction. The arched portion 28 of the brace 27 is of the same height at its inner end as the attaching plate 26 but it is of rapidly diminishing height outwardly so that the outer side wall 30 of the arched portion 28 is quite low, reaching only about to the top of the adjacent wheel 19. The brace 27 includes a narrow substantially flat web portion 31 integrally connecting and spacing the arched stirrup shaped portion 28 outwardly from the rear end portion of the attaching plate 26 so that one may have easy access to the nut 32 on the rear axle 13 when applying the stabilizers to the bicycle or when loosening and tightening of this nut is necessary afterward in adjusting the stabilizers up or down. A reinforcing flange 33 is bent forwardly from the top edge portion of the arched portion 28 of brace 27 and merges as best appears in Fig. 2 with reinforcing flanges 34 bent forwardly from the top and bottom edges portion of the web 31, thereby greatly stiffening and strengthening the structure as a whole and also presenting rounded non-scratching and non-cutting edges instead of what would otherwise be raw sharp edges. For similar reasons the arched portion 28 of the brace has forwardly bent edge portions defining a curved flange 35 across the top of the toe opening 29. To prevent or at least substantially reduce flexing of the wheel-carrying portion 27 of the bracket 16 relative to the attaching plate portion 26 U-shaped ribs 36 and 37 are formed in the lower rear portion of bracket 16 in vertically spaced substantially parallel relation, one leg of the U in each rib being on the attaching plate portion 26, the other leg of the U in each rib being on the arched portion 28 of brace 27, and the cross portion of the U in each rib extending transversely of the web 31, as best appears in Fig. 1. Rib 37 is extended as at 38 along the lower marginal edge portion of the attaching plate and up the front marginal edge portion as at 39 and along the top marginal edge portion as at 40 to avoid raw edges and to stiffen and strengthen all these portions too. It is necessary to have the rear end portion 41 of the attaching plate portion 26 offset inwardly in parallel relation to the rest of the attaching plate in order to have abutment with the thinner slotted rear end portion 42 of the rear fork as shown in Figs. 2 and 4 while the front end portion has abutment with the rest of the rear fork as appears in Figs. 2 and 3. This formation of the attaching plate would be apt to weaken it somewhat and for that reason the rib 36 is extended forwardly beyond the "break" line 43, and the same is of course true of rib 37, as clearly appears in Fig. 1, whereby to add sufficient reinforcing effect to more than offset the weakening effect.

Coming now to the improvements of our invention, the rear axle nut 32 is used for fastening the stabilizer attachment to the bicycle and bears against a washer 44, which in turn bears against a clamping plate 45 abutting the outer side of the attaching plate portion 26 of the bracket 16. The axle 13 may be entered through either one of two vertically aligned elongated slots 46 and 47 provided in the attaching plate. In Figs. 1 and 4 the axle is shown entered in slot 46 for a medium size or large bicycle, the slot 47 being used when the attachment is applied to smaller bicycles. The attaching plate has its offset rear end portion 41 abutting the thinner slotted rear end portion 42 of the rear fork, and hence when the nut 32 is tightened the attaching plate is clamped to the frame in whatever position it happens to be set with respect to the axle 13. To prevent slippage of the attaching plate from adjusted position the clamping plate 45 has a tapered or keystone-shaped lug 48 struck therefrom at an acute angle to the plane of the clamping plate and arranged with its narrower free end, that is a trifle narrower than either of the slots 46 and 47, projecting into the slot 46 so that the sharp edges 49 of the lug (which are the edges cut by the die in the punching operation) will bite into the attaching plate at the edges of the slot and take a good hold and thus eliminate likelihood of slippage. The clamping plate 45 is hardened, whereas the bracket 16 is left unhardened, so that the hardened tapered lug 48 will easily bite into the unhardened attaching plate 26 to the extent necessary to prevent slippage. Due to the spacing of the lug 48 with respect to the hole 50 through which the rear axle 13 projects, it will be seen that in certain positions of vertical adjustment of the bracket 16 the plate 45 will have to be turned end for end to enable having the lug 48 enter the slot 46, or the lug 48 may be entered in the upper end of slot 47 while the rear axle 13 is disposed in the lower portion of slot 46. The construction is, therefore, adaptable easily to meet requirements and no particular mechanical skill is required on the part of the one applying the stabilizer attachment or adjusting it.

The other clamping plate 51 at the front location on the attaching plate 26 is quite different in construction from plate 45 although it employs the same principle of preventing slippage by embedding the sharp die-cut edges 52 of the tapered or keystone-shaped lug 53 that is provided on one end of the plate in the edges of the vertical elongated slot 54 provided in the attaching plate. However, in this case the bolt 55 that is tightened to tighten the clamping plate 51 extends through a hole 56 provided in the plate 51 intermediate the ends thereof, the lug 53 being on one end and the arcuately shaped portion 57 for clamping engagement with the frame member 14 being provided on the other end. The bolt 55 has a washer 58 under the head thereof abutting the attaching plate on opposite sides of the slot 54, and a nut 59 is threaded on the rear end of the bolt into abutment with the back of the clamping plate 51. Reinforcing flanges 60 are bent inwardly from the longitudinal edge portions of the clamping plate 51 from a point adjacent the inner or wide end of the lug 53 to the far end, partly to resist deflection of the arcuate clamping portion 57 and partly to hold the nut 59 against turning, the nut having opposed facets in abutment with these flanges for that purpose, as indicated in dotted lines in Fig. 2. In this case too, the plate 51 is reversible end for end when the attaching bracket 16 is adjusted in a higher range where the bolt 55 is located above the rear fork 14. In certain instances, the one clamping plate 45 may have to be reversed to enable entry of the lug 48 in one of the slots 46 and 47 when the other plate 51 is not reversed, and vice versa. After one has become familiar with these stabilizer attachments this presents no difficulties even for a person having relatively little mechanical ability. The one slot 54 with the reversible clamping plate 51 enables locking the attaching plate in any position of vertical adjustment whether the rear axle 13 is entered in the upper slot 46 or lower slot 47.

In operation, the nuts 32 are removed from the rear axle 13 to permit application of the two brackets 16— the right and left hand ones—on opposite sides of the rear wheel, the axle 13 being entered in the appropriate slot 46 or 47. Then the clamping plates 45 are applied to the projecting ends of the axle with the lugs 48 entered in whichever of the two slots 46 and 47 they happen to register with. The preferred placement of the plates 45 is with the lugs 48 projecting downwardly but that may not be possible when certain adjustments are desired and in such cases the plates 45 are reversed end for end. The nuts 32 are not tightened until both the right and left hand brackets 16 are set at approximately the same desired elevation, and it is best to have the clamping plates 51 applied before the final tightening of the axle nuts 32 and bolts 55. After the child has learned to balance the bicycle well enough so that there will be less danger of tipping over, the brackets 16 can be adjusted a little higher and in that way the wheels 19 do not constitute a hindrance to the freedom of operation of the bicycle, and further upward adjustments of the brackets can be made as further progress is shown, until ultimately the brackets can be removed and either discarded or kept for future use by another child.

It is believed the foregoing description conveys a good understanding of the objects and advantages of our invention. The appended claims have been drawn to cover all legitimate modifications and adaptations.

We claim:

1. In a bicycle stabilizer, a bracket including a substantially flat attaching plate in a vertical plane adapted to be mounted on a rear wheel axle and rear fork of a bicycle, the bracket carrying a stabilizer wheel for outboard support of the bicycle, said plate having two vertically aligned elongated slots provided therein in either one of which the bicycle rear axle is received depending on the height of the axle relative to the stabilizer wheel, said plate having provided therein in spaced parallel relation to said slots another lone vertical elongated slot, a clamping plate for abutment with the outer face of said attaching plate and perforated to receive the axle and having in spaced relation to the perforation a lug of keystone shaped outline projecting in acute angle relation to said attaching plate and engageable wedgingly in whichever of the two axle receiving slots is registerable therewith, said lug taking hold in the slot when a nut on the axle is tightened against the clamping plate, another clamping plate of elongated form having at one end a clamp portion for engagement with the inner side of the fork and at the other end a lug of keystone shaped outline projecting in acute angle relation to said attaching plate and engageable wedgingly in the lone slot, and a bolt entered in said slot and connected to said last named clamping plate intermediate the ends thereof to tighten the plate relative to the frame and wedge the lug in the slot to take hold, said last named clamping plate being reversible end for end to dispose the plate with the lug above or below the bolt as required by the setting of the bracket.

2. A structure as set forth in claim 1 wherein the clamping plates are of hardened metal whereas the attaching plate is unhardened, and wherein the lugs on the clamping plates are punched so that the longitudinal edges thereof that bite into the edges of the slot in wedging therein are die-cut for sharpness.

3. In a bicycle stabilizer, a bracket including a substantially flat attaching plate in a vertical plane adapted to be mounted on a rear wheel axle and rear fork of a bicycle, the bracket carrying a stabilizer wheel for outboard support of the bicycle, said plate having a vertical elongated slot provided therein in which the bicycle rear axle is received, said plate having provided therein in spaced parallel relation to said slot another vertical elongated slot, a clamping plate for abutment with the outer face of said attaching plate and perforated to receive the axle and having in spaced relation to the perforation a lug of keystone shaped outline projecting in acute angle relation to said attaching plate and engageable wedgingly in said slot, said lug taking hold in the slot when a nut on the axle is tightened against the plate, another clamping plate of elongated form having at one end a clamp portion for engagement with the inner side of the fork and at the other end a lug of keystone shaped outline projecting in acute angle relation to said attaching plate and engageable wedgingly in the other slot, and a bolt entered in said slot and connected to said last named clamping plate intermediate the ends thereof to tighten the plate relative to the frame and wedge the lug in the slot to take hold.

4. A structure as set forth in claim 3 wherein the clamping plates are of hardened metal whereas the attaching plate is unhardened, and wherein the lugs on the clamping plates are punched so that the longitudinal edges thereof that bite into the edges of the slot in wedging therein are die-cut for sharpness.

5. In a slidably adjustable stabilizer attachment for a bicycle, a non-slip clamp construction comprising, in combination, an attaching plate having an elongated slot provided therein in which an end portion of a bicycle rear axle is adapted to be entered, a clamping plate perforated to receive the axle and having in spaced relation to the perforation a lug of keystone shaped outline projecting in acute angle relation to said attaching plate and engageable wedgingly in said slot, said lug taking hold in the slot when a nut on the axle is tightened forcing the plates together.

6. In a slidably adjustable stabilizer attachment for a bicycle, a non-slip clamp construction comprising, in combination, an attaching plate having an elongated slot provided therein, a clamping plate of elongated form having one end portion shaped to engage a portion of the rear fork of a bicycle to which the attaching plate is to be clamped and having on its other end a lug of keystone shaped outline projecting in acute angle relation to said attaching plate and engageable wedgingly in the slot, and a bolt entered in said slot and connected to said clamping plate intermediate its ends to tighten the plate relative to the fork and wedge the lug in the slot.

7. In a non-slip clamp, a stationary member, a slidably adjustable member having an elongated slot provided therein through which a threaded element projects from the stationary member, a nut threading on said threaded element and tightenable to clamp the adjustable member in adjusted relation to the stationary member, and a clamping plate under said nut perforated to receive said threaded element and having in spaced relation to the perforation a lug of keystone shaped outline projecting in acute angle relation to said clamping plate and engageable wedgingly in said slot, said lug taking hold in said slot when the nut is tightened against the clamping plate forcing the adjustable member and clamping plate together.

8. A non-slip clamp as set forth in claim 7 wherein the clamping plate is of hardened metal and the adjustable member is unhardened, and wherein the lug on the clamping plate is punched so that the longitudinal edges thereof that cut into the edges of the slot in wedging therein are die-cut for sharpness.

9. In a non-slip clamp, a first member, a relatively slidably adjustable second member having an elongated slot provided therein, a clamping plate of elongated form having one end portion shaped to engage the first member to which the adjustable second member is to be clamped, said clamping plate having at the other end a lug of keystone shaped outline projecting in acute angle relation to said clamping plate and engageable wedgingly in the slot, and a bolt entered through said slot and connected to said clamping plate intermediate its ends to tighten it relative to the first member and wedge the lug in the slot.

10. A non-slip clamp as set forth in claim 9 wherein the clamping plate is of hardened metal and the adjustable member is unhardened, and wherein the lug on the clamping plate is punched so that the longitudinal edges thereof that cut into the edges of the slot in wedging therein are die-cut for sharpness.

References Cited in the file of this patent

UNITED STATES PATENTS

| D. 168,202 | Wilkens | Nov. 11, 1952 |
| D. 169,391 | Ring | Apr. 21, 1953 |
| 575,631 | Brooks | Jan. 19, 1897 |
| 2,250,744 | Blu | July 29, 1941 |
| 2,514,266 | Walslager | July 4, 1950 |
| 2,601,994 | Richman | July 1, 1952 |
| 2,612,388 | McNeill | Sept. 30, 1952 |